APPARATUS FOR REGULATING SIGNALS IN RESPONSE TO THEIR TOTAL ROOT MEAN SQUARE VALUE

Filed Oct. 14, 1965

INVENTOR.
DAVID L. HANNA
NEALE A. ZELLMER
BY
ATTY.

United States Patent Office 3,466,572

Patented Sept. 9, 1969

3,466,572
APPARATUS FOR REGULATING SIGNALS IN RESPONSE TO THEIR TOTAL ROOT MEAN SQUARE VALUE

David L. Hanna, San Mateo, and Neale A. Zellmer, Belmont, Calif., assignors, by mesne assignments, to Automatic Electric Laboratories, Inc., Northlake, Ill., a corporation of Delaware Filed Oct. 14, 1965, Ser. No. 495,960
Int. Cl. H04b 3/04
U.S. Cl. 333—17 3 Claims

ABSTRACT OF THE DISCLOSURE

Light sensitive resistance devices and indirectly heated thermistors are employed as A.C.-D.C. transfer devices which operate on a RMS basis, rather than on an average power basis, in a feedback path of a regulator to provide a D.C. signal for comparison with a D.C. reference level. A D.C. signal derived from such a comparison is employed to control a variolosser in accordance with the total RMS signal in the transmission path.

This invention relates to regulating arrangements for communication systems. More particularly, the invention relates to arrangements for regulating the dynamic range of signals in a communication system in accordance with the root mean square (RMS) of the total power of the baseband.

Regulating arrangements which operate on the peak or average voltage of a single frequency are well known in the art, for example single pilot frequency carrier systems employ these techniques. However, a more realistic approach to regulation is needed in common equipment for a group of frequencies, for example in line and repeater equipment of emitted carrier or multipilot systems. Therefore, the primary object of the present invention is to provide new and improved regulating apparatus which operates on the RMS power of a communication system.

A more particular object of the invention is to provide new and improved RMS regulating apparatus for use in line and repeater group equipment of carrier systems.

In order to regulate on the RMS level of the total signal rather than, say on the peak level of a single signal, some apparatus must be employed which is capable of converting the RMS of the total signal to an appropriate variolosser control signal. A device capable of performing this function is the indirectly heated thermistor. Another such device is a light sensitive resistance device. Each of these devices are RMS controlled and provide, in proper circuitry configurations, direct current output signals which correspond to the RMS level.

A feature of the invention resides in the utilization of RMS operated devices to control a variolosser arrangement. Hereinafter, such devices will be called A.C.-D.C. transfer, or conversion devices, as opposed to rectifying devices which indicate average power conditions.

Other objects and features of the invention will become apparent and the invention will be best understood from the following description taken in conjunction with the accompanying drawings in which.

Figure 1:
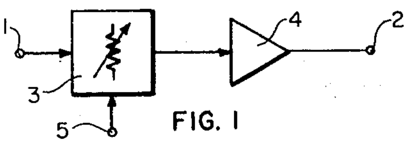
FIGS. 1 and 2 show in block diagram form two regulator configurations.

FIG. 1 describes a regulator arrangement comprising a signal transmission path including input terminal 1, variolosser 3, amplifier 4, and output terminal 2. A control input 5 is derived in any of several well-known ways to provide a D.C. control signal to the variolosser.

Figure 2:
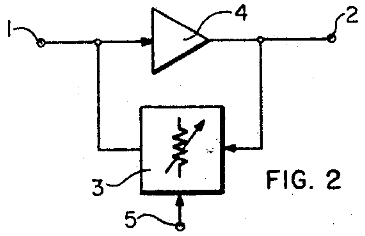

FIG. 2 shows the same elements where the variolosser is in a feedback loop. The variolosser arrangements may employ any of several well-known types of variable elements such as conventional diodes, symmetrical varistors, motor driven potentiometers, thermistors, memistors, or relay-controlled resistance combinations. Similarly in FIG. 3, which describes an embodiment of the invention, the variolosser may be any type of variolosser arrangement.

Figure 3:
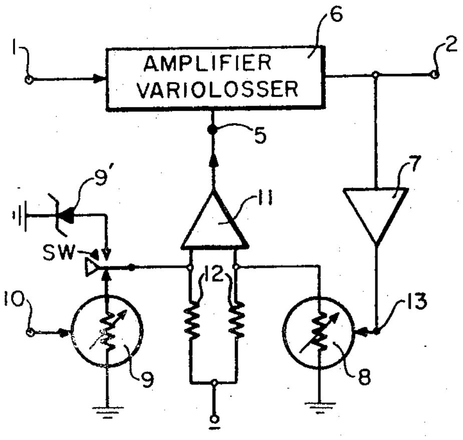
FIG. 3 is a schematic representation of an embodiment of the invention.

Referring to FIG. 3 a RMS regulating arrangement is described including an input terminal 1, an amplifier-variolosser arrangement 6, an output terminal 2, and an amplifier 7, A.C.-D.C. conversion devices 8 and 9, a differential amplifier 11 and resistances 12. Elements 8, 9, 11 and 12 form a bridge arrangement having a reference input 10, a RMS signal input 13 and the differential amplifier connected to the output. According to the invention the elements 8, 9 may comprise A.C.-D.C. conversion devices such as indirectly heated thermistors or light sensitive filament controlled resistances in which case inputs 10, 13 would be connected to the heater or filament electrodes therof. In the case of the light sensitive resistance, element 9 will supply a D.C. reference at one input of the differential amplifier and element 8 will supply a D.C. signal indicative of the RMS level at terminal 2. Switch SW is used only to show that Zener diode 9' can be used instead of element 9. The differential amplifier detects when the RMS output of the regulator is in error with respect to the D.C. reference and provides the variolosser with a control signal proportional to the error.

Figure 4:
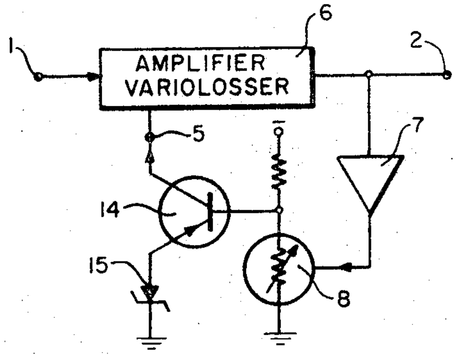
FIG. 4 is a schematic representation of another embodiment of the invention.

FIG. 4 describes a regulating arrangement which is similar to that of FIG. 3 and employs a Zener diode 15 to provide a reference to transistor 14 whose base-emitter junction is employed as an error detector. The collector of the transistor operates as the control circuit output.

Figure 5:
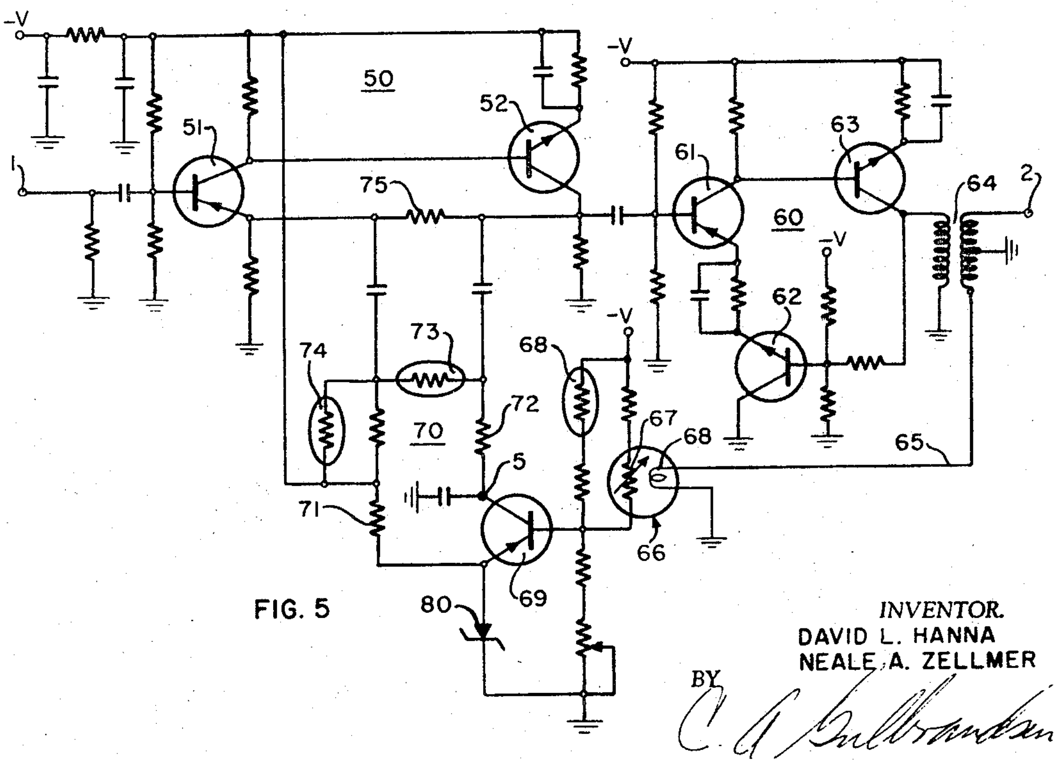
FIG. 5 is a schematic diagram of a variation of FIG. 4.

FIG. 5 describes a circuit similar to FIG. 4 showing that device 66 can be directly driven without the necessity signals is presented for regulation at terminal 1 and is passed via amplifiers 50 and 60 to output terminal 2 of transformer 64. A second terminal on the secondary of transformer 64 couples the output signals to the A.C.-D.C. transfer device via connection 65. The transfer device employed in an experimental model was a Raytheon Raysistor CK–1114. The signal on connection 65 heats the incandescent element 68 which in turn controls the resistance of light sensitive element 67. The device 66 has a positive temperature coefficient; therefore thermistor 68' having a negative temperature coefficient is employed to compensate for the heat of element 68. Zener diode 80 provides a D.C. reference and the emitter-base circuit of transistor 69 is employed as an error detector. Variolosser 70 is a temperature compensated arrangement employing directly heated thermistors 73, 74 and connected in circuit with amplifier transistors 51, 52. An increase in the RMS power level causes increased heating and light emission of filament 68. The resistance of element 67 decreases causing the transistor 69 to control the impedance of the variolosser and decrease the RMS level.

Many changes and modifications may be made in the invention by one skilled in the art without departing from the true spirit and scope of the invention and should be included in the appended claims.

What is claimed is:

1. In a communication system, a signal regulating apparatus comprising: an input line terminal and an output line terminal, a first amplifier circuit connected between said input line terminal and said output line terminal, said amplifier including a variolosser having a control terminal, a differential amplifier circuit having an output terminal and first and second input terminals, said differential amplifier being connected in a multileg bridge circuit, one leg thereof including a Zener diode connected to said first input terminal of said differential amplifier circuit to provide a reference voltage, and another leg including an A.C. to D.C. transfer means coupled between said output line terminal and said second input terminal of said differential amplifier, said transfer means providing to said second input terminal a D.C. signal proportional to the total root mean square of signals at said output line terminal, and said differential amplifier circuit being operated in accordance with the difference between said D.C. signal and said reference voltage to provide to said control terminal a control signal that is proportional to said difference.

2. In a communication system, a signal regulating apparatus comprising: an input line terminal and an output line terminal, a first amplifier circuit connected between said input line terminal and said output line terminal, said first amplifier including a variolosser having a control terminal, a second amplifier circuit having an output terminal and first and second input terminals, said output terminal being connected to said control terminal, source of D.C. reference level connected to said first input terminal of said second amplifier circuit, a variable resistance means including light-sensitive resistance means coupling said output line terminal to said second input terminal of said second amplifier circuit, and incandescent means coupled to said output line terminal and having its intensity determined by the total root means square of signals at said output line terminal for controlling the resistance of said light-sensitive resistance means, said light-sensitive resistance means being connected in a D.C. voltage circuit for controlling D.C. signal applied to said second input terminal of said second amplifier, and said second amplifier circuit being operated in accordance with the difference between said D.C. signal and said reference level to provide to said control terminal of said variolosser signal that is proportional to said difference.

3. In a communication system, the apparatus according to claim 2, wherein said light sensitive means has a first temperature coefficient, and further comprising means having an opposite temperature coefficient connected in circuit therewith to provide temperature compensation.

References Cited

UNITED STATES PATENTS

| | | | |
|---|---|---|---|
| 2,870,271 | 1/1959 | Cronburg et al. ______ | 333—14 |
| 2,233,061 | 2/1941 | Peterson ____________ | 333—14 |
| 3,213,391 | 10/1965 | Kovalevski __________ | 333—14 |
| 3,289,107 | 11/1966 | Zellmer et al. ________ | 333—14 |

HERMAN KARL SAALBACH, Primary Examiner

C. BARAFF, Assistant Examiner

U.S. Cl. X.R.

179—1; 330—29, 128, 144; 333—14